United States Patent [19]

Kawano et al.

[11] Patent Number: 4,945,740
[45] Date of Patent: Aug. 7, 1990

[54] VEHICLE STEERING LOCK DEVICE

[75] Inventors: Minoru Kawano; Tatsuro Yamashita; Noboru Izu; Shunsuke Shibata, all of Miyazaki; Norimithu Kurihara, Wako; Shigeo Hara, Wako; Kazuo Kojima, Wako; Masashi Takezawa, Wako, all of Japan

[73] Assignees: Honda Lock Mfg. Co., Ltd., Kiyazaki; Honda Giken K. K. K., Minato, both of Japan

[21] Appl. No.: 282,059

[22] Filed: Dec. 9, 1988

[30] Foreign Application Priority Data

Dec. 19, 1987 [JP] Japan ................. 62-322200
Dec. 19, 1987 [JP] Japan ................. 62-193085

[51] Int. Cl.⁵ ............................................. E05B 65/12
[52] U.S. Cl. ........................................ 70/248; 70/251; 70/255
[58] Field of Search ............... 70/245, 248, 251, 252, 70/254, 255, 257; 180/271, 287

[56] References Cited

U.S. PATENT DOCUMENTS

| 3,490,255 | 1/1970 | Wight et al. | 70/239 X |
| 3,590,612 | 7/1971 | Henning | 70/251 X |
| 3,590,613 | 7/1971 | Kimberlin | 70/248 X |
| 3,917,021 | 11/1975 | Williams et al. | 70/255 X |
| 4,232,538 | 11/1980 | Detloff, Jr. | 70/248 X |
| 4,258,560 | 3/1981 | Jessop | 70/252 |
| 4,487,042 | 12/1984 | Mochida | 70/252 X |

FOREIGN PATENT DOCUMENTS

| 2499005 | 8/1982 | France | 70/255 |
| 2499006 | 8/1982 | France | 70/255 |

Primary Examiner—Gary L. Smith
Assistant Examiner—Suzanne L. Dino
Attorney, Agent, or Firm—James R. Longacre; Michael L. Keller

[57] ABSTRACT

A vehicle steering lock device mounted to an automotive vehicle, in which a rotor in a cylinder lock is rotated to a lock position by the operation relevant to the rotor, comprises switching means for detecting a specific pushing operation to the rotor, etc. and switching means for detecting the situation of a shift lever to a parking position or not, in which rotation of the rotor to the locking position is allowed or inhibited in accordance with signals from both of the switching means and which enable safe parking on a downward slope and can prevent erroneous steering lock operation during down hill running without engine driving.

11 Claims, 4 Drawing Sheets

VEHICLE STEERING LOCK DEVICE

BACKGROUND OF THE INVENTION

1. Field of the Invention

The present invention concerns a vehicle steering lock device adapted to lock the steering shaft by the movement of a locking bolt upon rotation of a rotor in a cylinder lock actuated by key-operation made to an electric switch section for an ignition circuit, starter circuit, etc. of a vehicle engine.

More specifically, it relates to a steering lock device of the afore-mentioned type, in which a driver is always enforced to set a shift lever to a parking position whenever he gets off a vehicle drawing out an engine key, so that the vehicle does not happen to run spontaneously during stopping on a downward slope, as well as the steering shaft can surely be prevented from being locked during running by erroneous or accidental turning of the key to the locking position.

2. Description of the Prior Art

Various vehicle steering lock devices of the aforementioned type have already been proposed and put to practical use. For instance, there has been known a locking system in which a switching device for transmission and a steering lock-prevention device in an automotive vehicle are interlocked mechanically with each other, such that the locking operation to a steering shaft by a locking bolt is inhibited at any position other than the vehicle stop position, that is, the parking position of a shift mechanism (refer to U.S. Pat. No. 3490255, Robert D Wight, et al).

Accidental lock to the steering shaft can be avoided by this proposed device. However, since the device is mounted to a narrow space in a steering column in which a shift lever is attached as (a so-called column shift type), the structure is complicated. Further, if it is intended to apply such a device to a floor-shift system in which a shift lever is mounted to a car floor, the mechanical interlocking movement between the shift lever and the steering lock device will be difficult.

It has also been known a device in which the locking operation of such a steering lock device is electrically inhibited by the operation of a solenoid which is energized upon detection of the running state of a vehicle (refer to U.S. Pat. No. 3780032, by M. Suzuki, et al.).

In this device, accidental steering lock during running of the vehicle can be prevented, but the reference mentions nothing about counter-measures for a trouble that a vehicle parking along a downward slope would run spontaneously by itself after a driver gets off the vehicle.

Japanese Patent Laid Open Publication No. Sho 47-44629 discloses a locking device for preventing accidental locking to a steering shaft during running caused by driver's erroneous key operation, etc. In a case if a rotor in a cylinder lock is rotated by key manipulation at an engine stop position and, then, to a steering lock position erroneously, the rotation of the rotor is hindered by a stopper member which is operated upon energization of a solenoid by a signal from a sensor for detecting the running state of the vehicle.

In the proposed device just-mentioned above, however, since the solenoid is energized by a switch that detects the rotating operation of the key toward the lock position and, thereafter, the rotation stopper member is moved to its engaging position with the rotor, if the key manipulation is conducted too quickly, the hindering operation can not always function in time, to some time bring about a risk of locking to the steering shaft.

OBJECT OF THE INVENTION

It is, accordingly, a fundamental object of the present invention to provide a vehicle steering lock device of a type in which a steering shaft is locked upon rotation of a rotor in a cylinder lock, etc. by the manipulation of an engine ignition key, wherein the withdrawal of a key from the cylinder upon locking operation to the steering shaft is inhibited unless a shift lever is situated to the parking position, so that the vehicle can be stopped safely on a downward slope with no risk of spontaneous running, as well as erroneous steering lock can be prevented during down hill running of the vehicle.

Another object of the present invention is to provide a vehicle steering lock device of the aforementioned type, wherein the steering shaft can be locked only when a shift lever is set to a parking position, whereas steering lock during running is inhibited interlocking with the key pushing action made to a rotor in a cylinder at an accessory position or off position, so that safe parking on a downward slope is enabled or dangerous steering lock during down hill running can be prevented.

SUMMARY OF THE INVENTION

The foregoing fundamental object of the present invention can be attained by a vehicle steering lock device mounted to an automotive vehicle, in which a rotor in a cylinder lock is allowed to rotate to a lock position thereby locking a steering shaft by the rotating operation of the rotor or the operation other than the rotating operation of the rotor, wherein the device comprises:

a first switching means for detecting whether the operation other than the rotating operation of the rotor is made or not, and a second switching means for detecting whether a shift lever is situated at a parking position or not, in which the rotation of the rotor to the locking position is allowed or inhibited in accordance with signals from the first switching means and the second switching means.

In the steering lock device just mentioned above in accordance with the present invention, rotation of the rotor to the lock position is allowed only on the conditions that the shift lever is situated to the parking position and the operation other than the rotating operation, e.g., a key-pushing operation is made to the rotor in the cylinder lock, by the signals from the first and the second switching means.

Accordingly, a driver can get off a vehicle drawing out a key from the cylinder only after he sets the shift lever to the parking position, as well as there is no worry that the steering shaft should happened to be locked erroneously during down hill running of the vehicle without engine driving.

In a preferred embodiment, the first switching means is actuated by the pushing operation made to the rotor.

In another embodiment, the first switching means is actuated by the operation made to a pushbutton member or a knob attached to the steering lock device.

Such a pushbutton member is well-known and disclosed, for example, in U.S. Pat. No. 4487042, in which the rotation of a rotary disc extended from a rotor is controlled by a manual actuation member, for example, such that the rotor is permitted to rotate from an unlock position to a lock position for locking a steering shaft by a lock bolt only when a knob (pushbutton) attached to the actuation member is depressed.

Another object of the present invention can be attained by a vehicle steering lock device which is mounted to an automatic control vehicle, in which a rotor in a cylinder lock is rotated to a lock position by the key-operation made to the rotor at an accessory position or an off position and, further, a steering shaft is locked by the withdrawing operation of the key at the lock position, wherein the device comprises:

an electric circuit including;

a switching means which is opened when a shift lever is situated at a parking position and closed at any other position than the parking position, another switching mean which is closed by axial pushing operation made to the rotor at the accessory position or the off position, and an electromagnetically actuation means which is actuated when both of the switch means are closed; and a rotor rotation stopping mechanism which normally allows the rotation of the rotor, and engages the rotor upon actuation of the electromagnetically actuation means thereby inhibiting the rotor from rotating to the lock position.

In the device according to the present invention just mentioned above, if the shift lever of the vehicle is situated at the parking position, since the relevant switching means is kept open being interlocked therewith, the electromagnetically actuation means in the electrical circuit is deenergized, by which the rotation stopping mechanism for the rotor is kept out of the rotation region of the rotor, thereby enabling the rotor to freely rotate to the lock position.

In another case where the shift lever is situated at any other position than the parking position, for example, during running of a vehicle, the relevant switching means is kept closed interlocking therewith. Then, when the ignition key is operated so as to axially push the rotor into the cylinder at the accessory or off position, another switching means is closed, in addition to the aforementioned switching means. Then, the electromagnetically actuation means is actuated to engage the rotation stopping mechanism with the rotor thereby inhibit the rotation of the rotor to the lock position.

Accordingly, steering lock and key withdrawal can be made only when the shift lever is situated at the parking position, thus enabling safe parking, as well as rotation of the rotor to the lock position can be inhibited simultaneously with the axial pushing of the rotor at the accessory or off position, to surely prevent accidental steering lock during down hill running, etc.

The rotor, in a preferred embodiment, is slidably enhoused within a cylinder lock both axially and circumferentially and so adapted that it can take "start", "on", "accessory", "off" and "lock" positions selectively, and can be rotated to "lock" position subsequent to the axial pushing operation made thereto at "accessory" or "off" position.

In a preferred embodiment of the present invention, the first-switching means may be constituted as a shift lever switch interlocked with an operation member of the shift lever such that the switch contacts thereof are kept open when the shift lever is at the parking position and closed when the shift lever is at any other position.

In a preferred embodiment according to the present invention, another switching means interlocked with the axial pushing operation to the rotor may be embodied as a push switch having fixed and movable contacts and disposed in a recess formed to the inside of the cylinder about at a position corresponding to the axial pushing end of the rotor at the accessory or off position. This enables to engage the movable contacts with the fixed contacts interlocking with the axial pushing operation to the rotor at the accessory or off position and instantly energize the electromagnetic actuation means, to intrude the rotor rotation stopping mechanisms to the rotation region of the rotor to the lock position.

In a preferred embodiment, the electromagnetically actuation means can be in the form of a solenoid having a movable plunger, and the rotor rotation stopping mechanism can be in the form of a spring-biased stopper lever, the stopping end of which intrudes into or retracts from the rotation region of the rotor to the lock position depending on the stroking movement of the plunger of the solenoid.

DESCRIPTION OF THE ACCOMPANYING DRAWINGS

These and other objects, as well as advantageous features of the present invention will become more apparent by reading the following descriptions referring to preferred embodiments according to the present invention in conjunction with the appended drawings, wherein FIGS. 1A and 1B are explanatory views illustrating the principle for the constitution and the operation of a fundamental embodiment of a vehicle steering lock device according to the present invention, FIGS. 2A and 2B are explanatory views illustrating the principle for the constitution and the operation of another fundamental embodiment of a vehicle steering device according to the present invention, FIG. 3 is a longitudinal cross sectional view for a further specific embodiment of a vehicle steering lock device according to the present invention;

DESCRIPTION OF THE PREFERRED EMBODIMENT

The present invention is to be described more specifically by way of its preferred embodiments referring to the accompanying drawings.

Figure 1A:
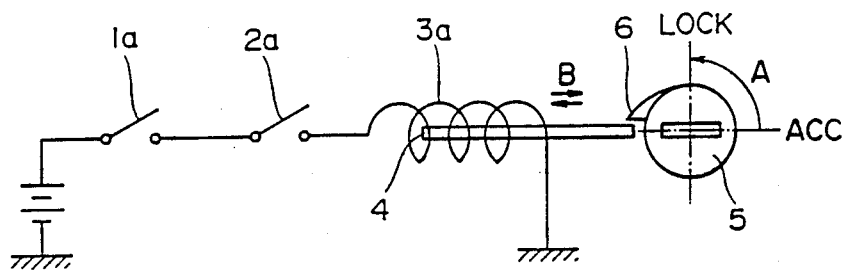
Figure 1B:
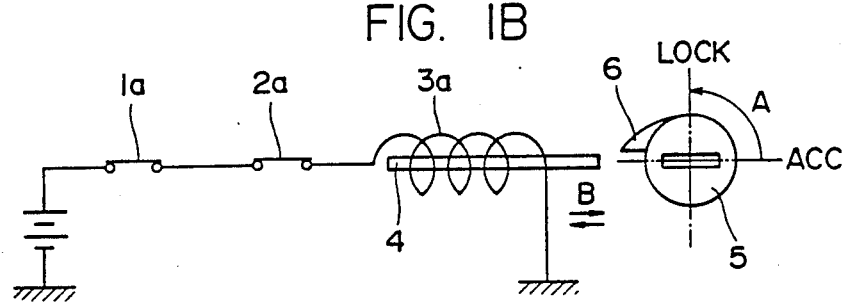
Figure 2A:
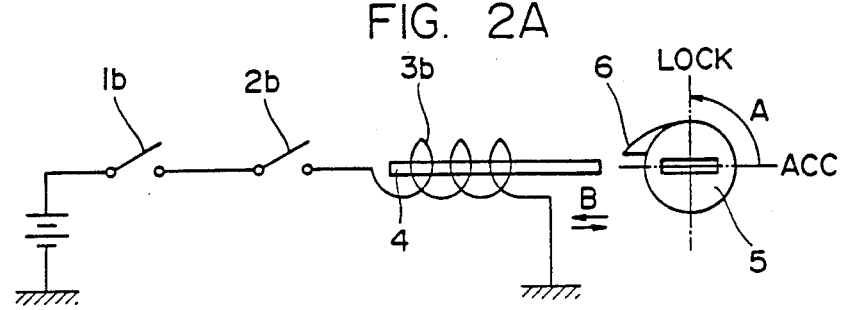
Figure 2B:
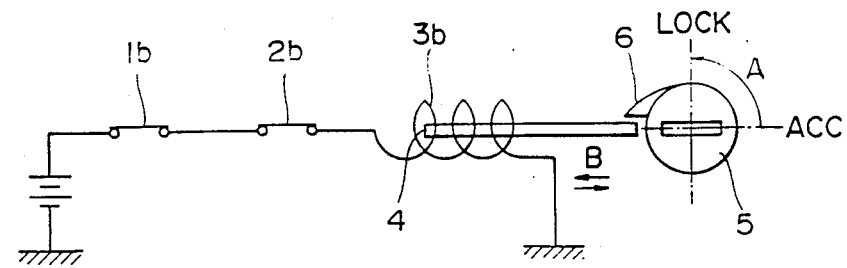

FIGS. 1A and 1B are schematic views for the electrical control section illustrating one example in which a rotation stopping member for stopping the rotation of a rotor of the steering lock device is normally situated at a position of inhibiting the rotation of the rotor. FIGS. 2A and 2B are schematic views for the electrical control section illustrating another example in which a rotation stopping member for stopping the rotation of a rotor of the steering lock device is normally situated at a position other than that of inhibiting the rotation of the rotor.

As shown in FIGS. 1A and 1B, an electrical circuit for controlling the rotation of the rotor comprises a first switch 1a, a second switch 2a, a solenoid 3a and a plunger 4a constituted as a stopper member for the rotation of the rotor 5a. They are connected in series with each other including a DC power source. The plunger or stopper member 4 is always biased by a spring (not illustrated) such that it abuts against a protrusion formed at the circumference of a rotor 5a (in the rightward direction along the arrow B in the figures), so that the circuit is established when both of the first switch 1a and the second switch 2a close their contacts, to energize the solenoid 3a.

In this circuit, it is adapted such that the first switch 1a is turned ON only when the pushing operation is made to the cylinder lock rotor or to a push button, whereas the second switch 2a is turned ON only when a shift lever (not illustrated) is situated at a parking position.

During running of vehicle, the rotor 5a of the cylinder lock is set at an ON position, while the shift lever is situated at a position other than the parking position.

In this state as shown in FIG. 1A, since the second switch 2a is kept OFF, the solenoid 3a is not energized and the stopper member 4 is situated at a position abutting against the protrusion 6a, to inhibit the rotation of the rotor 5a from the ACC (accessory) position to the LOCK (lock) position (in the direction of the arrow A in the figures). Accordingly, there is no worry that the rotor 5a is erroneously rotated to the steering lock position during running of the vehicle.

In a case where the vehicle is stopped, when the shift lever is situated to the parking position and pushing operation is made to the rotor 5a (or push button) intending to rotate the rotor 5a to the LOCK position, both of the first switch 1a and the second switch 2a are turned ON, as shown in FIG. 1B, whereby the solenoid 3a is energized and the stopper member 4 is attracted to retract from the inhibiting position to the protrusion 6a (leftwardly along the arrow B in the figure), to allow the rotation of the rotor 5a toward the LOCK position.

Accordingly, steering lock and the key withdrawal are possible only when the shift lever is situated at the parking position and safe parking at the downward slope is enabled.

In another embodiment shown in FIGS. 2A, 2B, the stopper member 4 is always kept out from a position abutting against the protrusion 6a of the rotor by a spring (not illustrated). The constitution and the operation of this embodiment are substantially the same as that shown in FIGS. 1A and 1B excepting that the first switch 1b is turned ON only when the operation regarding the rotation of the rotor 5a, for example, a pushing operation to the rotor is made, while the second switch 2b is turned off only when the shift lever is situated at the parking position.

That is, the second switch 2b is kept ON during running of the vehicle. Then, if a driver tries to rotate the rotor 5a toward the LOCK position by the pushing operation to the rotor 5a, the first switch 1b is turned ON to inhibit the rotation of the rotor 5a to the lock position.

In a case where the vehicle is stopped and when the shift lever is situated to the parking position, the rotation of the rotor 5 to the lock position is now enabled.

Accordingly, in the embodiments shown in FIGS. 1A, 1B, 2A, 2B, steering lock and key withdrawal are not possible unless the shift lever is at the parking position and an operator is enforced to set the lever at a parking position when he gets off the vehicle withdrawing a cylinder key, which can eliminate the danger of spontaneous running of the vehicle during parking on a downward slope.

On the other hand, since the stopper member 4 for the rotor 5a is always actuated to inhibit the rotation of the rotor to the steering lock position during down hill running without engine driving, it is no worry that the steering shaft is erroneously locked.

Now a further specific embodiment for the steering lock device according to the present invention is to be explained referring to FIG. 3 to FIG. 6.

Figure 3:
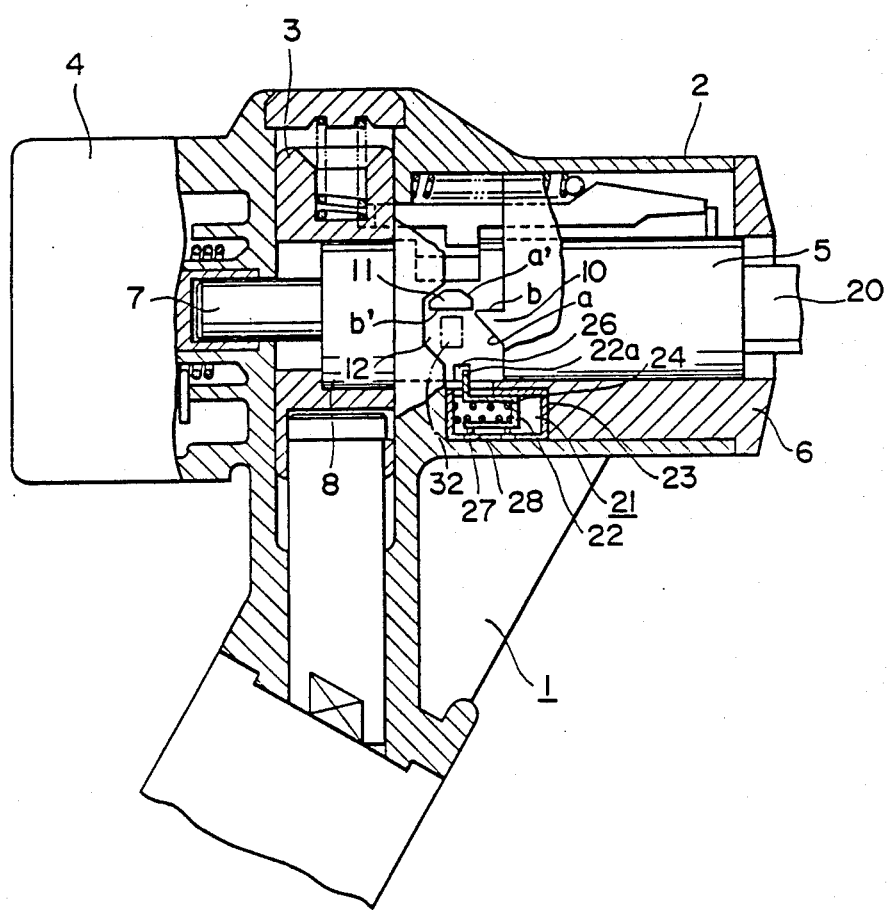

As shown in FIG. 3, a casing 1 of a steering lock device comprises a cylinder lock 2, a lock member 3 for locking a steering shaft (not illustrated) and an electrical switching section 4 that controls various circuits of an engine, e.g., for start, on, accessory, off, etc.

A rotor 5a of the cylinder lock 2 is disposed rotatably and axially slidably to the outer cylinder lock 2. The rotor has an operation rod 7 which is protruded integrally from its rear part and connected at its rearmost end to the electrical switching section 4. The rotor 5 is brought into a sliding contact with the lock member 3 by way of a semi-circular cam 8 formed as a radial protrusion at the intermediate portion of the rotor 5.

The lock member 3 is lifted by the rotation of the cam 8 along with the rotation of the rotor 5 from LOCK to ACC position against the force of a spring, by which a lock bolt (not illustrated) integral with the lock member 3 is detached from the steering shaft.

On the other hand, when the rotor rotates from ACC to LOCK position, the semi-circular cam 8 is detached from the lock member 3, which is then forced downwardly by the spring, whereby the lock bolt engages the steering shaft.

Further, the rotor 5 has an engaging protrusion 11 capable of engaging with a protrusion cam 10 disposed at the rear end face of the outer cylinder 6. The protrusion cam 10 and the engaging protrusion 11 have, respectively, slanted faces a, a' that ride over with each other upon rotation of the rotor 5 in the ON direction thereby making the rotor 5 to move slidably, as well as vertical faces b, b' that abut against with each other upon rotation of the rotor 5 toward the LOCK direction thereby stopping the rotation thereof. A recessed groove 12 is formed at a position of the inner surface of the casing 1 opposing to the engaging protrusion 11 for allowing the axial pushing of the rotor 5.

A push switch 21 for detecting the pushing operation of the rotor 5 is disposed within a recess 23 formed about at the rear end of the outer cylinder 6. A movable contact plate 22 of the pushing switch 21 is formed as a U-shaped configuration in which a return spring 24 is enhoused. An engaging protrusion 22a of the switch 21 is protruded into a recess 26 formed to the circumferential surface of the rotor 5, at a position away from and behind a plurality of tumbler grooves (not illustrated) which are engraved in perpendicular to the axial direction of the rotor 5.

That is, the pushing switch 21 is so adapted that when the axial pushing operation is made to the rotor 5, for example, at the ACC (accessory) position I (refer to FIG. 4), the movable contact plate 22 of the switch 21 is caused to slide by the axial pushing of the rotor 5 to the engaging protrusion 22a situated in the recess 26 and the movable contacts 27 of the contact plate 22 are abutted against fixed contacts 28 disposed at the bottom of the recess 23 of the outer cylinder 6. Accordingly, an electrical path of an electrical control circuit described later is closed.

Figure 4:
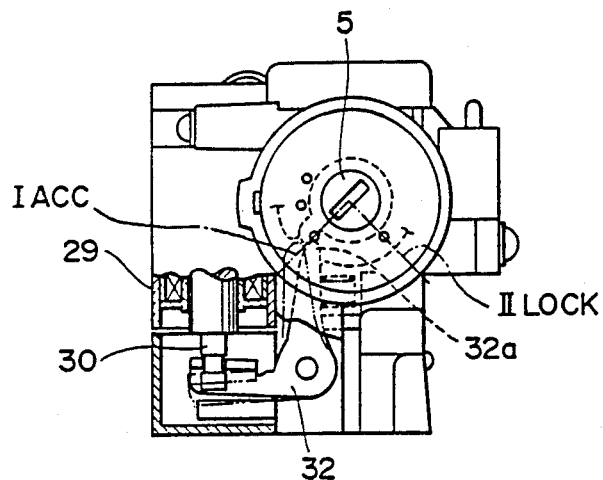
FIG. 4 is a front elevational view thereof.
Figure 5:
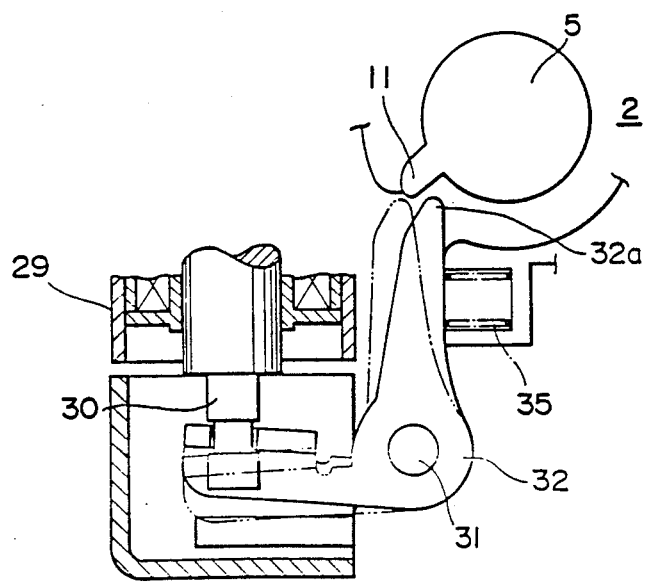
FIG. 5 is an enlarged explanatory view for a rotor rotation stopping mechanism shown in FIG. 4.

Then, as shown in FIGS. 4 and 5, a solenoid 29 is disposed to the casing 1 near the cams 10 and 11 that cooperate with each other to allow the rotation of the rotor 5 upon pushing operation. The solenoid 29 is so adapted that it is energized by the electric control circuit established including the push switch 21 which is closed upon pushing operation to the rotor 5 and a shift lever switch described later. Upon energization, the solenoid 29 attracts the plunger 30 upwardly in the drawing.

A double arm stopper lever 32 is rotatably pivoted on a fixed shaft 31 such that one end is situated in the vertical stroking region of the plunger 30 and the other stopper end 32a is retractably situated in the rotating region of the engaging protrusion 11 of the rotor 5 to the LOCK position II. It is so designed that the stopper end 32a is normally biased by a spring 35 to a position retracted from the rotational region of the engaging protrusion 11. After the pushing operation to the rotor 5 at the ACC position I (solenoid 29 energized in this state), the end 32a intrudes into the rotating region of the engaging protrusion 11 by the rotation of the lever 32 due to the upward attraction of the plunger 30 and engages the engaging protrusion 11 to inhibit the subsequent rotation of the rotor to the LOCK position II.

Figure 6:
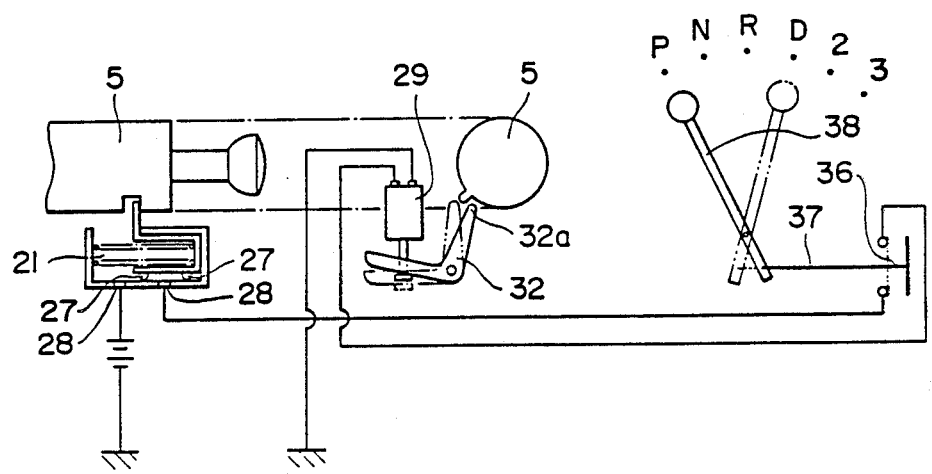
FIG. 6 is an explanatory view for a schematic and somewhat functional constitution that illustrates the operation of an electrical control section of the vehicle steering lock device together with its respective operation steps.

As shown in FIG. 6 illustrating the operation function of the device, a shift lever switch 36 is interposed in the electrical control circuit comprising the push switch 21, the solenoid 29 and a DC power source. The shift lever switch 36 is so adapted that it interlocks with the operation of the shift lever 37 to various shift positions such as P (parking), N (neutral), D (drive), etc., and it is opened at the position P while closed at any other position (for example, at D in the drawing).

The operation is to be explained next.

Assuming that the shift lever 38 of the vehicle is situated at the position D (other than the P position) in FIG. 6 during down hill running of the vehicle and a driver intends for running by interrupting the engine, he at first pushes the cylinder lock rotor 5 at the ACC position I. Then, the push switch 21 is closed by the pushing operation to the rotor 5, for example as shown in FIG. 3 (in the figure, the movable contacts 27 are shown at the state just going to be in contact with fixed contacts 28). Meanwhile, the shift lever switch 36 shown in FIG. 6 is closed since this is the vehicle running state (shift lever at D as shown by the dotted chain) and, accordingly, an electrical control circuit is established including the switches 21, 36, the solenoid 29, as well as the DC power cell.

Thus, the solenoid 29 is energized and the stopper end 32a of the stopper lever 32 moves into the rotation region of the protrusion 11 of the rotor 5 to the LOCK position II against the resiliency of the spring 35. Thus, the stopper end 32a engages the protrusion 11 thereby inhibiting the rotor 5 from further rotating to the LOCK position II.

Accordingly, even if a rotational force toward the LOCK position is applied to the rotor 5 accidentally or intentionally after the rotor has been pushed at the ACC position I during running of the vehicle, the rotor 5 can no more rotate in that direction, by which the risk of the steering lock during running can reliably be prevented.

In this embodiment, since the shift lever switch 36 is always kept closed during running and the push switch 21 is turned on simultaneously with the axial pushing of the rotor 5 at the ACC position I, the stopper lever 32 has already been actuated by the solenoid 29 at the instance when the rotor 5 is started to rotate to the LOCK position II. Therefore, the rotation of the rotor to the LOCK position II can surely be inhibited.

The shift lever switch 36 is kept open when the shift lever 38 is situated at the P position during parking (shown by the solid line). Accordingly, the solenoid 29 is not energized even when the push switch 21 is closed by the pushing operation to the rotor 5 at the ACC position I and, therefore, the stopper lever 32 does not swing and the rotor 5 can freely rotate to the LOCK position II with no hindrance, thereby enabling to lock the steering shaft.

In this embodiment, the electric control circuit for energizing the solenoid 29 is kept open in this parking state and wasteful consumption of the power source during long time parking etc. can be avoided.

Although a serial electric circuit comprising the shift lever switch 36, the push switch 21 and the solenoid 29 as shown in FIGS. 6 are used as the electric control circuit in this embodiment, there are no particular restrictions only thereto but a circuit may also have a contact circuit comprising a relay, transistor, etc.

In the present invention having thus been constituted, erroneous driver's operation of rotating the cylinder lock rotor to the LOCK position during running of a vehicle can reliably be prevented by employing a mechanism for stopping the rotor by the stopper lever upon detecting the pushing operation to the rotor at the ACC or OFF position and upon detection that the shift lever is situated at a position other than the parking position.

In addition, since the rotor is allowed to rotate to the LOCK position only when the situation of the shift lever at the parking position is detected in the present invention, when the driver gets off a vehicle drawing out a key from the cylinder lock, the shift lever has always to be situated at the parking position, which means braking operation is applied automatically making it possible to park the vehicle even on a downward slope with safety.

Furthermore, since the push switch for detecting the pushing operation to the rotor is situated at the rear end of the outer cylinder while being kept away from the rotational traces of a plurality of tumbler grooves disposed axially to the rotor, the arrangement is made easy. In addition, the engaging member of the movable contact plate of the push switch protruded into the recessed groove at the circumferential surface behind the tumbler grooves of the rotor can reliably be operated for two way of movements, that is, rotating and axial pushing of the rotor.

While the present invention has been particularly illustrated and described with reference to preferred embodiment thereof, it will be understood by those skilled in the art that the foregoing and other changes in forms and details can be made therein without departing from the spirit and scope of the invention.

What is claimed is:

1. A vehicle steering lock device mounted to an automotive vehicle, in which a rotor in a cylinder lock is allowed to rotate to a lock position thereby locking a steering shaft only when a first operation of rotating said rotor and a second operation other than said first operation are respectively conducted simultaneously wherein the device comprises a first switching means for detecting whether said operation other than the first operation is made, and a second switching means for detecting whether a shift lever is situated to a parking position or not, in which the rotation of said rotor to the lock position is allowed or inhibited in accordance with signals from said first switching means and said second switching means.

2. A vehicle steering lock device as defined in claim 1, wherein the operation, other than the rotating operation of, made to the rotor of the cylinder lock is a pushing operation to said rotor.

3. A vehicle steering lock device as defined in claim 1, wherein the operation, other than the rotating operation of, made to the rotor of the cylinder lock is a pushing operation to a pushbutton member.

4. A vehicle steering lock device as defined in claim 1, wherein the device comprises a stopper means which is biased at a position of inhibiting the rotor from rotating to the lock position and retracted from said position by signals from the first switching means and the second switching means.

5. A vehicle steering lock device as defined in claim 1, wherein the device comprises a stopper means which is biased from a position inhibiting the rotor from rotating to the lock position and intruded into said position by signals from the first switching means and the second switching means.

6. A vehicle steering lock device which is mounted to an automotive vehicle, in which a rotor in a cylinder lock is made rotatable to a locking position by the axial key-operation made to said rotor at an accessory position or an off position and, further, a steering shaft is locked by the withdrawing operation of the key at said lock position, wherein the device comprises:

an electric circuit including:

a first switching means which is closed when a shift lever is situated at a parking position and opened at any other position than said parking position;

a second switching means which is closed by the axial pushing operation made to said rotor at the accessory position or the off position, and an electromagnetically actuation means which is actuated when both of said switching means are closed; and a rotor rotation stopping mechanism which normally allows the rotation of the rotor, and engages said rotor upon actuation of the electromagnetically actuation means, thereby inhibiting the rotor from rotating to the lock position.

7. A vehicle steering lock device as defined in claim 6, wherein the first switching means is a shift lever switch interlocked with an operation member of the shift lever such that the switching contacts thereof are kept open when said shift lever is situated at the parking position, while kept closed when said shift lever is situated at any position other than said parking position.

8. A vehicle steering lock device as defined in claim 6, wherein said second switching means is a push switch disposed within a recess formed to the inside of the lock cylinder about at a position corresponding to the axial pushing end of the rotor at the accessory position or the off position, and so adapted that movable contacts of said push switch make an electrical contact with fixed contacts thereof interlocking with the axial pushing of said rotor to said axial pushing end, thereby closing an electrical path.

9. A vehicle steering lock device as defined in claim 6, wherein the electromagnetically actuation means is a solenoid adapted to actuate its plunger depending on the opening or closure of the respective switching means in the electric control circuit and the rotor rotation stopping mechanism comprises a stopper lever pivoted rotatably on a fixed shaft and so adapted to intrude into and retract from the rotation region an engaging protrusion of said rotor toward the lock position.

10. A vehicle steering lock device mounted to an automotive vehicle, in which a rotor in a cylinder lock is allowed to rotate to a lock position thereby locking a steering shaft by the rotating operation of said rotor and the operation of the pushing on the rotor, wherein the device comprises a first switching means for detecting whether said pushing operation is made or not, and a second switching means for detecting whether a shift lever is situated to a parking position or not, in which the rotation of said rotor to the lock position is allowed or inhibited in accordance with signals from said first switching means and said second switching means.

11. A vehicle steering lock device mounted to an automotive vehicle, in which a rotor in a cylinder lock is allowed to rotate to a lock position thereby locking a steering shaft by the rotating operation of said rotor and the operation of a pushbutton member, wherein the device comprises a first switching means for detecting whether said pushbutton has been operated, and a second switching means for detecting whether a shift lever is situated to a parking position or not, in which the rotation of said rotor to the lock position is allowed or inhibited in accordance with signals from said first switching means and said second switching means.

* * * * *